Jan. 15, 1935.   H. E. BABBITT ET AL   1,987,888
SLUDGE DIGESTION
Filed June 5, 1930   2 Sheets-Sheet 1

Inventors
Harold E. Babbitt
Harry E. Schlenz

Jan. 15, 1935. H. E. BABBITT ET AL 1,987,888
SLUDGE DIGESTION
Filed June 5, 1930  2 Sheets-Sheet 2

Witness:
William P. Kilroy

Inventors
Harold E. Babbitt
Harry E. Schlenz
By Brown, Jackson, Boettcher & Dienner
Attys Patented Jan. 15, 1935

1,987,888

UNITED STATES PATENT OFFICE 1,987,888

SLUDGE DIGESTION

Harold E. Babbitt and Harry E. Schlenz, Urbana, Ill., assignors to Board of Trustees of the University of Illinois, Urbana, Ill., a corporation of Illinois Application June 5, 1930, Serial No. 459,397

5 Claims. (Cl. 210—2)

This invention relates to sewage sludge digestion.

The usual method of digesting sludge is to allow it to remain in a tank for three or four months during which time the material is decomposed by bacteriological and chemical action. The process is generally a continuous one, new material being periodically added to the tank and some of the digested material being periodically withdrawn.

During the first few days of decomposition an appreciable amount of gas having a high calorific value is generated. This gas may be collected and sold.

It has long been known that the digestion of sewage solids occurs in two stages, a so-called acid or foul stage, followed by the alkaline or methane stage. In well operating tanks the two stages of digestion go on together and at such a rate that the alkalies apparently produced in the second stage of digestion neutralize the acids produced in the first. In some cases, however, the acid stage predominates and it is difficult to obtain satisfactory digestion without special procedure. For regulating such conditions the addition of lime has been employed. The cost of lime necessary is frequently so great as to prohibit its use. It has also been recommended that a certain minimum amount of old sludge be maintained in the digestion tank to keep the acid digestion from predominating.

It has been found that the acid stage of digestion, which is the first stage, results largely in the digestion of so-called greases which include animal and vegetable fats, and the soaps. It is during this stage of digestion that most of the valuable gases are liberated and also during this stage that the scum or foam is formed. As a result of a study of the possible chemical reactions that must occur during the decomposition of fats and greases it has been found that if the acid and alkaline stages of digestion are separated, that is, carried on in different tanks, certain advantages are had. It has been found that there is at first a relatively rapid fermentation which results in the decomposition of the simpler compounds and the production of a large quantity of gas. This fermentation is apparently completed in a few days. It has been observed that 50% of the gas is evolved in the first twenty-four hours and that 90% of the gas is evolved in the first four to eight days. After this stage of fermentation has reached completion it is still necessary to allow the sludge to undergo some sort of ripening process. The exact nature of this digestion is not understood, but the net result is that the sludge loses its water-binding property and can be drained on sand beds. This second stage of digestion may last for several months.

Previously it has been found to be feasible to carry on sludge digestion in two separate stages, in which all of the grease troubles have been encountered in the first stage, leaving the second tank comparatively free from trouble. Such an arrangement, as provided in the past, however necessitated the additional pumpage of sludge from the first of these tanks to the second tank, with the resulting additional supervision. It is one of the objects of the present invention to provide a two stage sludge digestion system wherein these objectionable features are overcome. We attain this object, in the form of our invention herein shown for illustrative purposes, by providing a tank which consists of two vertically spaced compartments separated so as to permit the sludge to pass downward from the upper compartment and arrange to prevent gas from passing upward from one compartment to the other. Fresh sludge is added to the upper or primary compartment, retaining the grease of the sludge in that compartment until the grease has decomposed, when it passes into the lower compartment. All of the material which will not cause scum troubles will pass immediately from the upper compartment into the lower compartment for digestion. All of the troubles from foaming and the formation of a scum layer are centralized in this primary compartment.

The liquor displaced from the tank by the addition of fresh sludge comes from the upper compartment and is quite low in solids due to the relatively slight disturbance from gas currents.

The tank of the present invention improves greatly upon the present type of sewage sludge digestion tanks in that the scum troubles are easily controlled since they are concentrated in the comparatively small upper chamber. Also the arrangement of one chamber above the other provides for the ready transfer of sludge from one stage to the other without the necessity of pumpage or supervision. The cost of construction of the one tank having two chambers is much less than that of two separate tanks to accomplish the same result, and the area required for such a tank is likewise much less.

We provide means for preventing the passage of gases from the lower chamber into the upper chamber. In the particular embodiment herein illustrated this means comprises a triangular beam placed below the opening in the upper tank for deflecting the gases from the lower tank away from the opening. We have found that the gas vents provided in the lower compartment for permitting the escape of gases remain free at all times and do not require any attention.

Fresh solids from a settling tank or the like are added to the primary chamber at a point just above the lower opening therein and the liquor is displaced from the opposite end of this same chamber at a slightly higher elevation. Digested sludge may be drawn off from the bottom of the lower compartment.

We have invented a new method of carrying on sewage digestion by the use of a tank having a small upper compartment and a comparatively large lower compartment. The characteristic feature of our method consists in introducing the sewage sludge into the upper tank for primary digestion and permitting it to flow into the secondary tank for secondary digestion, the rate at which sludge is introduced into the upper compartment and withdrawn from the tank being such that the greases remain in the upper compartment until they are completely digested.

Since the material in the primary chamber will pass into the secondary chamber as soon as it becomes partly digested, only a comparatively small volume is necessary for the primary chamber. In one investigation we have found that a volume of .20 cubic foot per capita was more than adequate for the primary chamber.

The size of the secondary chamber is governed by the amount of storage necessary and the degree of digestion desired. It was found that about 0.50 cubic foot per capita was required for the lower compartment, provided the temperature of the compartment was maintained between 20 degrees and 25 degrees centigrade.

We provide means for collecting the gases generated in both compartments by the digestion of the sewage sludge. We have found that at an average tank temperature of 17 degrees centigrade there is obtained an average of 3.22 cubic feet of gas per pound of volatile solids in tests extending over three week periods, whereas at 26 degrees centigrade an average of 8.52 cubic feet of gas are obtained from a like amount of volatile solids in a like period of time. Since the rate of gas production at 26 degrees centigrade is more than two and one-half times as great as at 17 degrees centigrade, we have found that there is considerable economy in heating the sludge digestion chamber, and consequently speeding up of the digestion rate. We have found that the gases produced contain about 70 percent methane and therefore have a high calorific value. It was calculated that on a basis of a separate sludge digestion tank installation for a population of 10,000, a total heat value of 1,850,000 B. t. u. per twenty-four hours would be obtained from the gas produced at a digestion temperature of 17 degrees centigrade. If the temperature of the tank were maintained at 26 degrees centigrade, then a total of 3,010,000 B. t. u. would be generated, of which 710,000 would be required to maintain the temperature of the tank, leaving 2,300,000 available. This represents a net increase of 450,000 B. t. u. per day. The rate of sludge digestion at higher temperatures is greatly increased and less storage space is required.

We are aware that sewage sludge digestion tanks having an upper compartment communicating with a lower compartment into which the sludge is transferred have heretofore been used. Such a tank is shown, by way of example, in the patent to Thackwell, Number 1,599,731, issued September 14, 1926. This tank is likewise provided with means for preventing the passage of gases generated in the lower compartment into the upper compartment through the communicating opening between the two compartments. Such tanks, in so far as we are aware, are however not truly two stage digestion tanks. Such tanks are generally rather long, in a horizontal direction, and raw or unseparated sewage is introduced into the upper compartment at one end of the tank, the sewage flowing through the tank in a generally horizontal direction and out at the other end of the upper compartment. During the flowing of the sewage through the upper compartment, lengthwise thereof, the sludge tends to settle to the bottom of the upper compartment and thence flows into the lower compartment. The upper compartment thus serves as a sedimentation chamber rather than as a digestion chamber, the entire digestion taking place in the lower compartment. Our invention differs basically from arrangements such as above described in that we introduce, into the upper compartment, not raw sewage, but concentrated sludge such as may be obtained after the sludge in the sewage has been permitted to settle in a settling tank or the like, or as a result of the filtration of the sludge out of the sewage. The upper compartment of our tank receives the concentrated sewage sludge and retains the same until the substantial completion of the primary or acid stage of digestion whereupon the same then passes into the lower compartment where the secondary digestion takes place. The foul stage of digestion therefore takes place in the comparatively small upper compartment wherein all the foam, scum, and gas producing troubles are concentrated thereby freeing the lower compartment of those troubles.

The attainment of the above and further objects of the present invention will be apparent from the following specification taken in conjunction with the accompanying drawings forming a part thereof.

In the drawings:—

Figure 1:
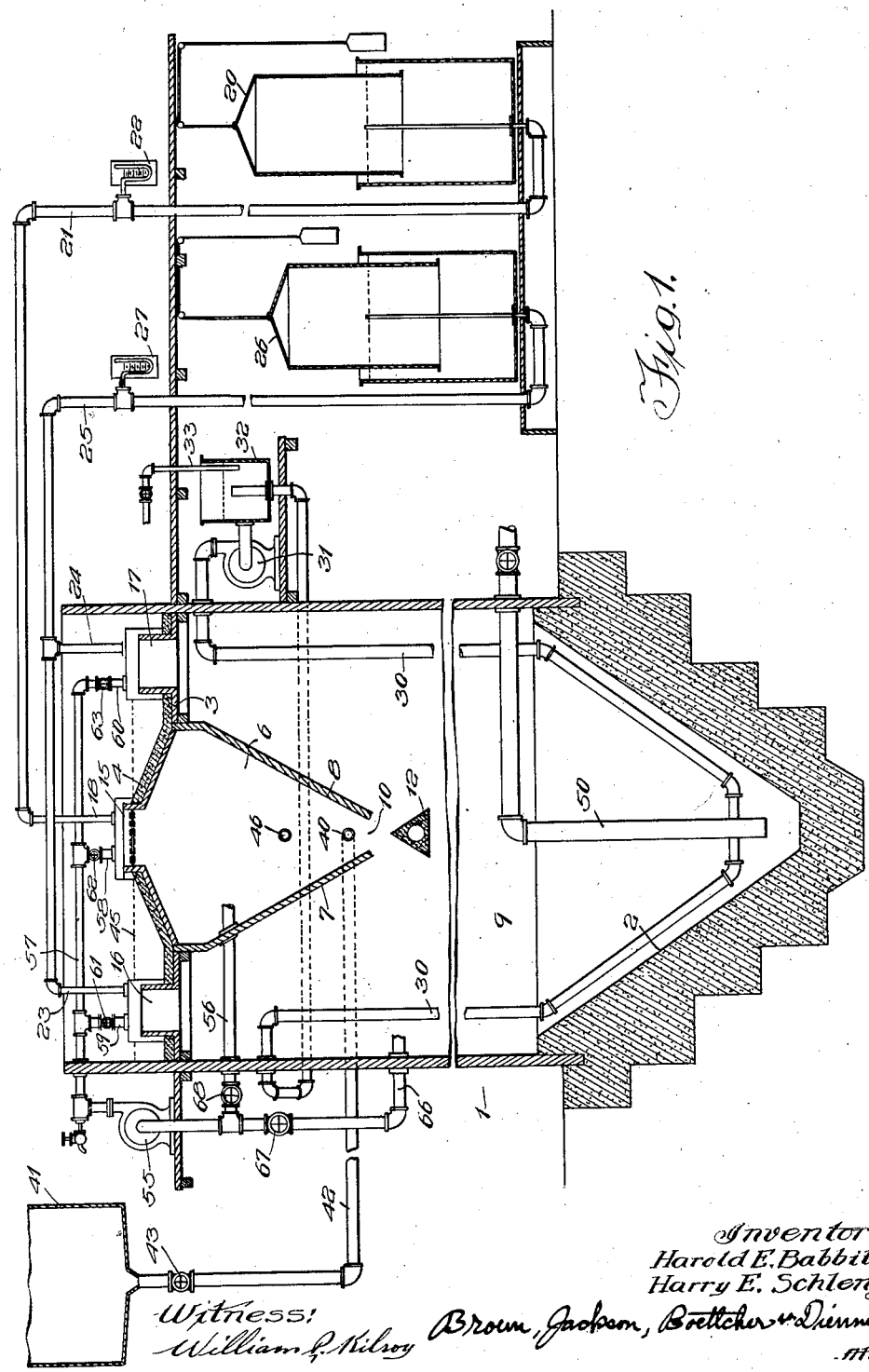
Figure 1 is a diagrammatic sectional view of our two stage sludge digestion system.
Figure 2:
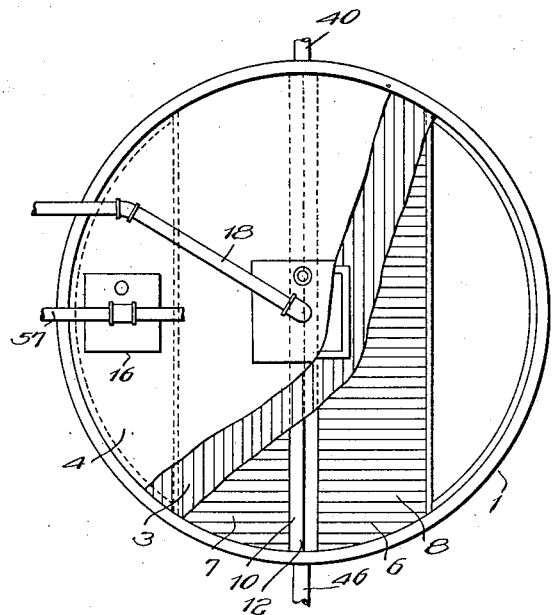
Figure 2 is a sectional plan view of our two stage sludge digestion tank.

Referring now more particularly to the drawings, the sludge digestion tank is indicated at 1 and is of a generally circular or cylindrical shape and has a conical bottom 2 formed of concrete or the like. The tank may be made of wood or any other suitable material. The tank is provided with a wooden cover support 3 which supports a concrete cover 4. A hopper 6 is suspended from the cover and extends into the tank. The hopper includes two inclined members 7 and 8 which constitute the hopper bottom, said members extending across the tank. The compartment 6 is known as the primary compartment and the compartment 9 is known as the secondary compartment. It is to be noted that the hopper bottom members 7 and 8 of the primary digestion tank 6 do not close the bottom of the primary compartment but are separated at the bottom of the compartment to form a slot 10. This permits settled material to flow from the primary digestion chamber into the secondary digestion chamber. A triangular beam 12 extends across the tank at a distance slightly below the slot 10. This beam does not interfere with the downward flow of sludge from the primary compartment but does prevent the entrance of gas bubbles into the primary compartment from the secondary compartment. The primary compartment is provided with a gas vent 15 and the secondary compartment is provided with two gas vents 16 and 17. A pipe 18 extends from the primary compartment 6 and is adapted to receive the gases generated in this compartment, said pipe extending to a gas collector 20 by way of a pipe 21, a suitable gauge 22 being provided for indicating the gas pressure. Pipes 23 and 24 are connected together and the gas from the gas vents 16 and 17 of the secondary chamber passes into those pipes and, by way of the pipe 25, to a gas collector 26, a suitable gauge 27 being provided for indicating the gas pressure. Heating pipes 30 extend through the secondary compartment and a pump 31 is provided for circulating hot water through the pipes 30 in order to maintain the sludge within the tank at the desired temperature. The water is circulated from a receptacle 32 and may be maintained heated by means of a steam line 33 or may be heated by gas burners in any desired manner. It is, of course, to be understood that any other desired form of heating means may be provided for the digestion tank. The primary compartment 6 is provided with a sludge inlet 40 which may be located about one foot above the slot 10, sludge being introduced into the primary compartment from a settling tank 41 by way of a conduit 42 under the control of a valve 43. It is, of course, to be understood that the settling tank may be of any desired construction for preconcentrating sewage sludge and may comprise a settling tank of the kind well known in the field of sewage treatment, or may comprise any other preferred type of equipment for concentrating the sewage. The digestion tank is filled to a level indicated by the dotted line 45. The liquor thus provides a seal for the gas hoods above the openings in the primary and in the secondary compartments. Fresh sludge is pumped into the primary chamber periodically and the displaced liquor is allowed to pass off by means of a pipe 46 located at the mid-point of the upper chamber and at the opposite side of the tank from that at which the sludge is added. We have found that the fatty substances tend to rise to the top of the primary compartment where they remain until digestion has taken place. The non-fatty substances tend to gravitate into the lower compartment where they undergo decomposition. It is to be noted that the rate at which sludge is added into the tank is such that very little disturbance is caused thereby so that there is substantially no tendency for particles of grease or the like to be carried downward through the slot 10 by a rapid current flow. The particles of grease and the like remain at the top of the primary compartment until they have undergone the first stage of digestion or decomposition and after that they tend to gravitate into the lower compartment by way of the slot 10 where they remain until finally digested. A pipe 50 extends to a point close to the bottom of the secondary compartment 9 and by means of this pipe digested sludge may be pumped out of the tank.

In an installation to care for the sludge settled from sewage, on the basis of 1000 population, wherein the sewage sludge has a moisture content of about 97.5 per cent, the daily sludge output being about 500 gallons, (100 pounds of solids on a dry basis), the upper compartment should be of about 200 cubic feet capacity and the lower compartment of about 500 cubic feet capacity. This is on the basis of maintaining the tank temperature at about 25 degrees centigrade.

The size of the upper compartment is adequate to allow for sufficient storage for the grease particles until they are sufficiently digested to pass into the lower compartment. This stage of digestion takes from four to eight days. The amount of liquor displaced from the upper compartment is equal to the amount of sludge added each time, except when sludge is removed from the lower compartment. Sludge is not withdrawn from the lower compartment daily but is allowed to build up and is removed after about a two months digestion period. For best digestion only a portion of the sludge is removed each time, the period between drawings being about one month.

In order to prevent the accumulation of scum or foam in the primary compartment, or to break up such scum or foam when the same forms, we provide a circulator which comprises a pump 55 which is adapted to withdraw liquor from the primary compartment, the pipe 56 being provided for this purpose and to re-deposit the same at the top of the foam or scum in that compartment. The pipe 56 enters the primary compartment at a point below the level to which the scum or foam may extend and withdraws comparatively clear liquor from the compartment, the pump outlet being connected to a pipe 57 which has a branch 58 extending to the top of the primary compartment. The pipe 57 also has branches 59 and 60 extending to the vents 16 and 17 of the secondary compartment so that circulation of liquor to the secondary compartment may be had if desired. Suitable valves 61, 62 and 63 are provided for controlling the flow of liquor from the pipe 57. Usually the valves 61 and 63 are closed, whereas the valve 62 is open so that circulation takes place only in the primary compartment. The pump may also withdraw liquor from the secondary compartment and for this purpose a pipe 66 enters the secondary compartment. Valves 67 and 68 control the action of the pump in withdrawing liquor from either of the two compartments. In the usual operation of the digestion tank the valve 67 is closed whereas the valve 68 is open so that liquor is withdrawn only from the primary compartment. It is, of course, obvious that by this arrangement liquor may be transferred directly from the secondary compartment into the primary compartment by opening the valves 67 and 62 and closing the valves 68, 61 and 63. Likewise, a transfer may be made from the primary compartment into the secondary compartment in a manner which is obvious. We have found that by operating the circulator 55 for a few minutes each day the scum or foam that may have formed can be broken up and kept from accumulating to an undesirable degree. In circulating the liquor all violent agitation should be avoided and the liquor should be preferably deposited on the top of the scum in a light spray.

Figure 3:
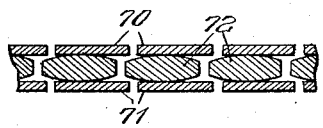
Figure 3 is a fragmentary sectional view of a grid used to aid in preventing foam and scum troubles.

To further reduce the scum or foam trouble we placed a grid, such as is shown in Figure 3, into the gas vents 15, 16 and 17. The purpose of the grids was to prevent the clogging of the gas vents or gas lines by the entrance of scum, the grids being placed immediately under the gas hoods in the vents. The grids comprise an upper layer of slats 70, a lower layer of slats 71 and an intermediate layer of slats 72. The slats in each layer are spaced apart about one-sixteenth of an inch, the slats being about two and one-half inches wide and extending across the vent opening. We have, however, found that the grids could be very well omitted from the vents 16 and 17 without any trouble, since very little scum or foam tends to form in those vents. If desired, the grid may also be omitted from vent 15 since the circulator 55 effectively prevents the formation of scum or foam in this vent. It is to be noted that the pipe 58 is provided with a spray apparatus 59 within the vent 15 for depositing the liquor on top of the scum in the form of a fine spray. The spray apparatus may, of course, be of any preferred construction.

In compliance with the requirements of the patent statutes we have herein shown and described a preferred embodiment of our invention. It is, however, to be understood that the invention is not limited to the precise construction herein shown, the same being merely illustrative of the invention. What we consider new and desire to secure by Letters Patent is—

1. Sludge digestion means comprising a tank having two digestion chambers, one of which is smaller than the other, the smaller chamber being located at the upper portion of the larger chamber, and having an inlet for the introduction of undigested sludge therein and having means for collecting the gases generated during the decomposition of the sludge, the smaller chamber having also an outlet opening in the bottom for transferring the partially digested sludge into the larger chamber upon the substantial completion of the gas forming stage of decomposition and having an overflow outlet above the inlet and substantially below the top of the sludge level.

2. Sludge digestion means comprising a tank having two digestion chambers, one of which is smaller than the other, the smaller chamber being located within and at the top portion of the larger tank, and having an inlet for the introduction of undigested sludge therein and having means for collecting the gases generated during the decomposition of the sludge, the smaller chamber having also an outlet opening in the bottom for transferring the partially digested sludge into the larger chamber upon the substantial completion of the gas forming stage of decomposition and having an overflow outlet above the inlet and substantially below the top of the sludge level, and means for preventing the passage of gases from the lower chamber into the upper chamber through the opening between the chambers.

3. In combination with a sewage separation means, a sewage sludge digestion tank having a relatively small upper compartment communicating with a relatively large lower compartment for the transfer of sludge thereto, means for transferring concentrated sewage sludge from the sewage separation means to the upper compartment of the digestion tank, a cover for the upper compartment, and gas collecting means for collecting the gases generated in said upper compartment by the decomposition of the sewage sludge.

4. In combination with a sewage separation means, a sewage sludge digestion tank having a relatively small upper compartment communicating with a relatively large lower compartment for the transfer of sludge thereto, means for transferring concentrated sewage sludge from the sewage separation means to the upper compartment of the digestion tank, a cover for the upper compartment, gas collecting means for collecting the gases generated in said upper compartment by the decomposition of the sewage sludge, and means for preventing the passage of gases from the lower compartment into the upper compartment through the communicating opening between the two.

5. A two stage sludge digestion tank having separate primary and secondary digestion compartments, and means for preventing the accumulation of scum in the primary digestion compartment, said means comprising a circulator for withdrawing liquor from the secondary digestion compartment and depositing it upon the scum that may form in the primary digestion compartment.

HAROLD E. BABBITT.
HARRY E. SCHLENZ.